J. P. WHITLOW.
COFFEE-POT.

No. 173,703.

Patented Feb. 15. 1876.

Witnesses
John Becker
Fred. Haynes

J. P. Whitlow
by his Attorneys
Brown & Allen

UNITED STATES PATENT OFFICE.

JOHN P. WHITLOW, OF TAMAROA, ILLINOIS.

IMPROVEMENT IN COFFEE-POTS.

Specification forming part of Letters Patent No. 173,703, dated February 15, 1876; application filed January 17, 1876.

*To all whom it may concern:*

Be it known that I, JOHN P. WHITLOW, of Tamaroa, in the county of Perry and State of Illinois, have invented a new and useful Improvement in Coffee-Pots; and I do hereby declare that the following is a full, clear, and exact description of the same, reference being had to the accompanying drawing, which forms part of this specification.

My invention is primarily intended for use in extracting the matters soluble in boiling water and contained in coffee; but it is equally applicable to making decoctions or infusions of tea or other herbs, extracting, and at the same time separating, soluble from insoluble portions.

This invention consists in notching the rim of the cover of the pot or vessel, and arranging in the vessel a perforated septum, which extends from side to side of the vessel, and from the bottom to the top thereof, the notches in the rim of the cover permitting the top of the said septum to come up flush with the cover when the latter is closed.

Figure 1:
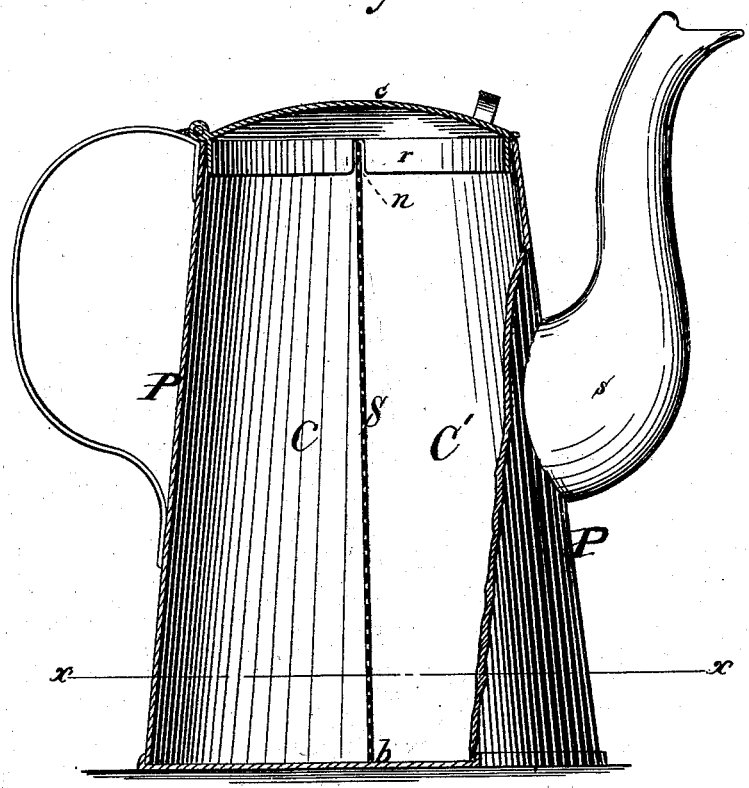
Figure 2:
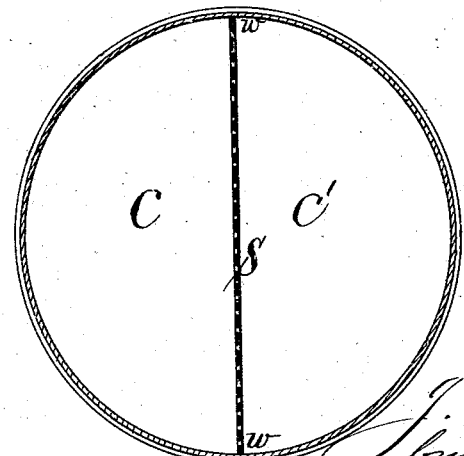

Figure 1 in the drawing represents a vertical section of my improved coffee-pot, and Fig. 2 is a horizontal cross section.

S represents the transverse finely-perforated partition or septum, extending from side to side of said pot or vessel, and upward from the bottom. It is made of sheet metal, with many holes of sufficient fineness punched therein; or it may be made of wire-gauze or other suitable material, and it is attached to the bottom $b$ and side walls $w$ of the pot P by solder, rivets, or any other suitable means. The said perforated septum S divides the space in the interior of the vessel into the chambers C and C', the chamber C' communicating directly and freely with the spout $s$, and the chamber C communicating with the chamber C' through the perforations P in the perforated septum S. The cover $c$ of the pot or vessel P has formed in its rim $r$ notches $n$, which permit the entrance into the said notches of the upper edge of the said perforated septum when the cover $c$ is closed, and allows the said septum to be brought up flush against said cover when closed, so as to prevent an escape of the solid contents of the chamber C over the top of said septum S into the chamber C', but, instead of notching the said rim, the upper part of the said septum may be notched to admit the said rim.

In this construction of the pot or vessel, I obtain a vessel easily cleaned, without detachable parts to readjust after cleaning, and in which I can most thoroughly, economically, and rapidly extract the virtues of coffee or tea, and, in the case of coffee, without the necessity of eggs or other albuminous or gelatinous matter to cause the settling of the grounds, the said vessel or pot being used in the following manner:

The coffee, tea, or other substance to be infused or steeped is placed in the chamber C. The requisite quantity of water or other liquid is then added and the cover $c$ closed. The law of diffusion will then in due time distribute the dissolved matters through the perforations in the septum S; but this diffusion may be hastened by gently agitating the contents of the vessel, either by shaking the vessel and its contents, or by stirring the contents with a suitable implement. When the infusion, decoction, or solution is poured out from the spout $s$, the undissolved portions are retained in the chamber C by the perforated septum S, while the liquid contents of the said chamber C pass freely through the said perforated septum S into the chamber C', and thence out of the spout $s$. While the steeping progresses, if boiling water be used, the pot will be less likely to boil over, as the steam escapes through the perforated septum S, and reaches the space at the top through the unobstructed surface of the liquid in the chamber C', instead of violently lifting the cohering coffee-grounds in a mass, as is the case in the use of ordinary coffee-pots.

In the drawing the transverse perforated septum S is shown as perpendicular to the bottom $b$ of the vessel; but it may be inclined, so as to leave the top of either chamber, C or C', wider than the bottom of the same chamber, for greater convenience in cleaning the chamber so enlarged at the top.

I claim—

The cover $c$, having the rim $r$, formed with notches, $n$, in combination with the septum S, substantially as and for the purpose herein set forth.

JOHN P. WHITLOW.

Witnesses:
 C. C. JEWELL,
 D. C. BARBER, Jr.